(12) United States Patent
Smith et al.

(10) Patent No.: US 6,823,905 B1
(45) Date of Patent: Nov. 30, 2004

(54) INFLATION VALVE ASSEMBLY FOR A DUNNAGE OR CARGO AIR BAG

(75) Inventors: Rodney S. Smith, Franklin, TN (US); Thomas C. Keenan, Franklin, TN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/642,236

(22) Filed: Aug. 18, 2003

(51) Int. Cl.[7] .......................... B65B 1/08; F16K 15/00
(52) U.S. Cl. ..................... 141/68; 141/67; 141/114; 141/313; 137/522; 137/527.8
(58) Field of Search ....................... 141/37, 67, 68, 141/114, 313, 348, 382–386; 137/522, 523, 527.8

(56) References Cited

U.S. PATENT DOCUMENTS 4,146,070 A * 3/1979 Angarola et al. ............ 141/68
5,042,541 A   8/1991 Krier et al.
5,839,488 A   11/1998 Peters
6,138,711 A   10/2000 Lung-Po \* cited by examiner

*Primary Examiner*—Timothy L. Maust
(74) *Attorney, Agent, or Firm*—Schwartz & Weinrieb

(57) ABSTRACT

An inflation valve assembly, for a dunnage or cargo air bag, comprises an annular flange member which is adapted to be heat-sealed to an interior surface portion of one of the plies of the inflatable bladder of the air bag, and an externally threaded nipple portion for fluidic connection to a source of pressurized fluid for inflating the bladder of the dunnage or cargo air bag. A flapper valve member, having a substantially circular configuration, has an end portion which is adapted to be fixedly secured upon an arcuate portion of the upper surface portion of the annular flange member by a fixation bar which extends along a chordal extent of the annular flange member. Opposite end portions of the fixation bar project radially inwardly toward each other so as to effectively define a pair of oppositely disposed detents for maintaining the flapper valve member in its OPENED state.

22 Claims, 4 Drawing Sheets

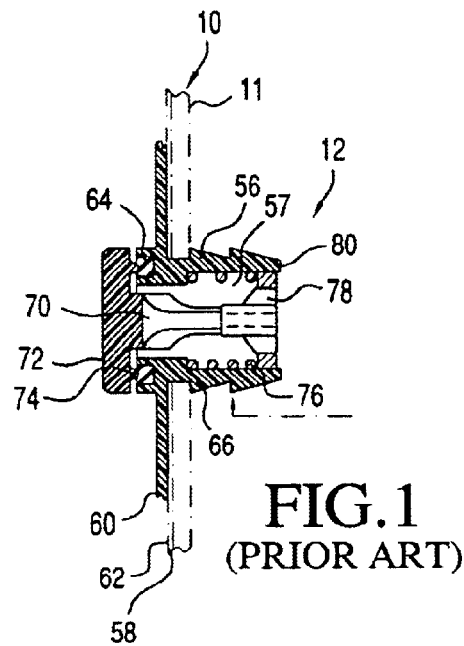
FIG.1
(PRIOR ART)
FIG.2
(PRIOR ART)
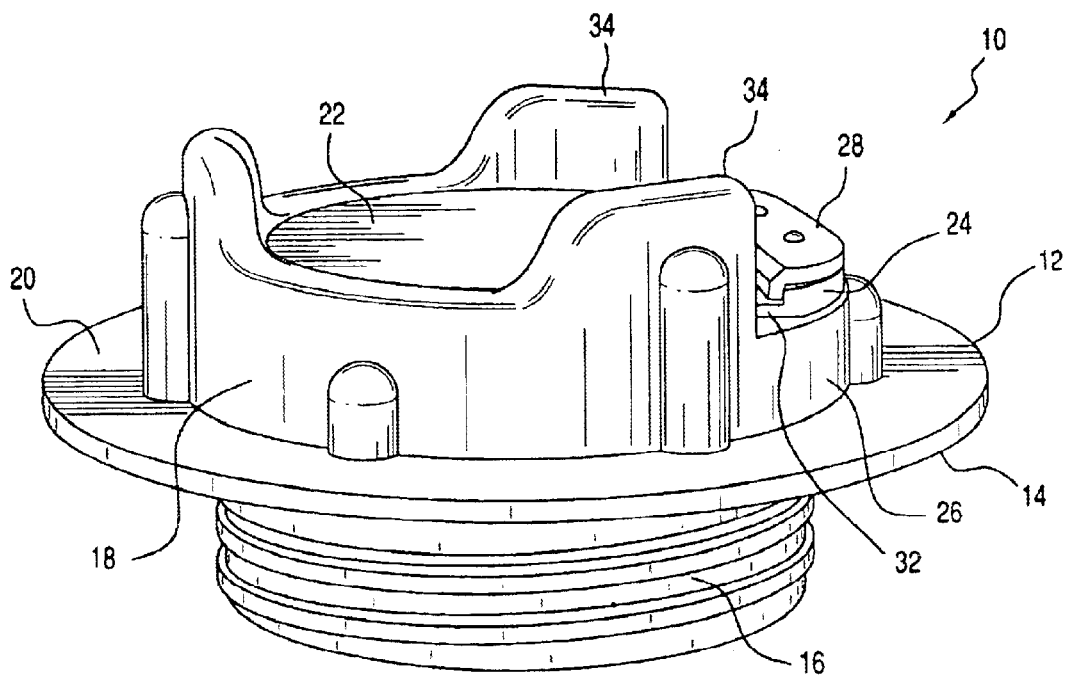

INFLATION VALVE ASSEMBLY FOR A DUNNAGE OR CARGO AIR BAG

FIELD OF THE INVENTION

The present invention relates generally to dunnage air bags, and more particularly to a new and improved inflation valve assembly for facilitating the inflation of an inflatable bladder disposed interiorly of, or comprising, a dunnage air bag for use in connection with securing or bracing cargo within the holds of, for example, railroad cars, airplanes, ships, truck trailers, and the like.

BACKGROUND OF THE INVENTION

Cargo or dunnage air bags are used within the cargo shipment or transportation industry as a means for readily and easily securing or bracing cargo within the holds of, for example, railroad cars, ships, airplanes, truck trailers, and the like. Such dunnage or cargo air bags conventionally comprise an inflatable bladder which is enclosed within an outer bag or envelope which is conventionally fabricated from a plurality of paper plies. The air bags are conventionally of such construction and size as to readily enable the same to be inserted into voids or spaces defined between spaced loads, or between a particular cargo load and a side or end wall of the cargo container or hold, whereupon inflation of the air bag, the air bag will expand thereby fixedly engaging the adjacent cargo loads, or the cargo load and container wall, so as to secure the cargo loads against undesirable movement during transit. Obviously, in order to achieve the inflation of the cargo or dunnage air bags to a predetermined pressurized level, such air bags are also conventionally provided with an inflation valve assembly so as to permit pressurized air or compressed air to be conducted into the interior portion of the inflatable bladder so as to inflate the same, or to permit the pressurized air or compressed air, already disposed within the inflated bladder, to be conducted out from the interior portion of the inflatable bladder so as to deflate the same.

A first conventional PRIOR ART inflation valve assembly is disclosed, for example, within FIG. 1 which substantially corresponds to the inflation valve assembly portion of FIG. 2 as illustrated within U.S. Pat. No. 5,042,541 which issued to Krier et al. on Aug. 27, 1991, and it is seen that this inflation valve assembly utilizes a spring-biased valve stem mechanism. More particularly, as can be readily appreciated from FIG. 1, a cargo air bag is generally indicated by the reference character 10 and is seen to comprise a paper bag 11 and an inflatable bladder 62. The inflation valve assembly is generally indicated by the reference character 12 and is seen to comprise a tubular valve body 56 defining a hollow space 57 therewithin, and an annular flange portion 60 integrally fixed thereto. The tubular valve body 56 is adapted to be inserted through an aperture defined within a wall 58 of the cargo air bag 10 such that the free distal end 80 of the valve body 56 projects outwardly from the cargo air bag 10 so as to be externally accessible for fluidic communication with a suitable air inflation fixture or assembly by means of which the compressed or pressurized air can be conducted into the interior portion of the inflatable bladder 62. An external annular shoulder portion 66 of the valve body 56 engages an outer surface of the air bag 10, while the annular flange portion 60 is adapted to be ultrasonically welded to an interior wall portion of the inflatable bladder 62 so as to form an air-tight seal therewith.

The inflation valve assembly 12 also comprises a valve stem 70 which extends through the hollow space 57 of the valve body 56. A closure plate 72 is disposed upon a first end of the valve stem 70, and a spring member 76 is interposed between an internal shoulder portion of the valve body 56 and a second opposite end 78 of the valve stem 70. An annular valve seat 64 is defined upon an interior portion of the valve body 56, and an annular ridge 74 is defined upon the closure plate 72. Accordingly, the spring member 76 normally biases the closure plate 72 and its annular ridge 74 onto the valve seat 64 such that the inflation valve assembly 12 may be disposed in a first CLOSED position or state whereby pressurized air or compressed air cannot be conducted into the interior of the inflatable bladder 62, or alternatively, pressurized air or compressed air, already contained within the inflated bladder 62, is not permitted to escape from the inflated bladder 62. Conversely, when a force is imposed upon the free end portion 78 of the valve stem 70, the valve stem 70 is axially moved against the biasing force of spring member 76 such that the closure plate 72 and its annular ridge 74 are moved away from the valve seat 64 such that the inflation valve assembly 12 may be disposed in a second OPENED position or state whereby pressurized air or compressed air can be conducted into the interior of the inflatable bladder 62, or alternatively, pressurized air or compressed air already contained within the inflated bladder 62 is permitted to escape from the inflated bladder 62.

In lieu of the spring-biased valve stem mechanism as disclosed within Krier et al., the inflation valve assembly may alternatively comprise a flapper valve member which is mounted upon the inner end portion of a tubular valve body so as to likewise be movable between, for example, a first CLOSED position or state, either by means of the inherent resiliency of, for example, a living hinge structure, or as a result of being biased to the CLOSED position or state by means of the internal pressure within the inflatable bladder when the interior portion of the inflatable bladder has actually been pressurized, whereby the internal pressurized air is able to be effectively and sufficiently retained within the interior of the inflatable bladder of the dunnage or cargo air bag until, for example, an external closure cap is able to be threadedly engaged upon the inflation valve assembly so as to effectively close and seal the inflation valve assembly, and a second OPEN state or position as a result of, for example, being manually manipulated whereby the flapper valve member is able to effectively be moved away from its valve seat formed upon a nipple portion of the inflation valve assembly so as to permit an inflation nozzle to be fluidically mated therewith whereby pressurized air or compressed can be introduced into the interior of the inflatable bladder of the dunnage or cargo air bag. A second conventional PRIOR ART inflation valve assembly, comprising a flapper valve member, is disclosed, for example, within FIGS. 2–4 and is generally indicated by means of the reference character 10.

More particularly, with reference being made to FIGS. 2–4, it is seen that the second conventional PRIOR ART inflation valve assembly 10 comprises an annular flange member 12 wherein, for example, the undersurface portion 14 of the annular flange member 12 is adapted to be heat-sealed to an interior surface portion of the inflatable bladder while an externally threaded nipple portion 16 of the inflation valve assembly 10 is adapted to project outwardly through means of a suitable aperture formed within the ply of the inflatable bladder, as well as suitable apertures formed within the one or more paper plies comprising the dunnage or cargo air bag. In this manner, when a suitable inflation nozzle, not shown, is fluidically connected to the nipple portion 16 of the inflation valve assembly 10, pressurized air or compressed air can be conducted into the interior of the inflatable bladder so as to inflate the same. In addition to the aforenoted structure, characteristic of the second conventional PRIOR ART inflation valve assembly 10, it is further seen that the second conventional PRIOR ART inflation valve assembly 10 also has an annular upstanding ring member 18 integrally disposed upon the upper surface portion 20 of the annular flange member 12. As can best be appreciated from FIG. 4, a substantially planar, disc-type flapper valve member 22, having a substantially circular configuration, has an end portion 24 which is adapted to be fixedly secured upon an arcuate portion 26 of the annular upstanding ring member 18 by means of a fixation bar 28 which extends along a chordal extent of the annular upstanding ring member 18.

As can best be seen from FIG. 3, the radially interior peripheral wall portion of the annular upstanding ring member 18 is provided with an inner flange member 30 which effectively serves as a valve seat for the substantially planar, disc-type flapper valve member 22 when the flapper valve member 22 is disposed in its CLOSED position or state as shown in FIG. 2. It is also noted that the substantially planar, disc-type flapper valve member 22 is fabricated from a suitable rubber composition, and accordingly, that portion of the substantially planar, disc-type flapper valve member 22 which is disposed immediately adjacent to the fixation bar 28, inherently defines a living hinge portion 32 by means of which the flapper valve member 22 is adapted to be readily pivotally moved between its OPENED and CLOSED positions as respectively disclosed in FIGS. 3 and 4, and FIG. 2. As can be additionally appreciated from FIGS. 3 and 4, the annular upstanding ring member 18 is provided with a plurality of circumferentially spaced, upstanding projections or ears 34, and it is seen that when the substantially planar, disc-type flapper valve member 22 is moved from its CLOSED position as illustrated in FIG. 2, to its fully OPENED position as illustrated within FIGS. 3 and 4, opposite side portions of the flapper valve member 22 will encounter the upstanding projections or ears 34 which are disposed adjacent to the opposite ends of the fixation bar 28, the opposite side portions of the flapper valve member 22 will accordingly be partially deformed as a result of being compressed radially inwardly by means of such upstanding projections or ears 34, and the flapper valve member 22 will therefore effectively be able to be moved past such upstanding projections or ears 34. Subsequently, once the flapper valve member 22 has in fact moved past such upstanding projections or ears 34, the side portions of the flapper valve member 22 will effectively regain their normal, non-compressed state such that the upstanding projections or ears 34 will serve to retain the flapper valve member 22 at its OPENED position or state as illustrated in FIGS. 3 and 4. In this manner, the inflation valve assembly 10 is then able to have an inflation nozzle member, not shown, fluidically mated with the nipple portion 16 of the inflation valve assembly 10 so as to facilitate inflation of the inflatable dunnage or cargo air bag bladder. It is lastly noted, as can best be appreciated from FIG. 3, that in order to manually manipulate the flapper valve member 22 and move the same from its CLOSED position as illustrated in FIG. 2, to its fully OPENED position as illustrated in FIGS. 3 and 4, the external or undersurface portion of the flapper valve member 22, as illustrated in FIG. 3, is provided with an outwardly or downwardly extending projection or finger member or block 36.

While the aforenoted inflation valve assembly 10 has exhibited satisfactory field operation, it is noted that as a result of the provision of the plurality of circumferentially spaced upstanding projections or ears 34, the inflation valve assembly 10 is characterized by means of a substantially large height dimension or depth profile. Considered from a slightly different perspective, the height dimension or depth profile of the inflation valve assembly 10 is substantially increased, by means of the provision or presence of the plurality of circumferentially spaced upstanding projections or ears 34, when considered with respect to the height dimension or depth profile of the annular upstanding ring member 18 within which the valve seat 30 is defined. This substantially large height dimension or depth profile of the inflation valve assembly 10 presents significant problems in connection with the logistics comprising the fabrication of the inflatable bladder member, not shown, of the dunnage or cargo air bag. More particularly, as a result of the second conventional PRIOR ART inflation valve assembly 10 being characterized by means of the aforenoted substantially large height dimension or depth profile, the sealing together of the opposite plies of the inflatable bladder member is rendered more difficult.

Still further, when structurally incorporating an inflation valve assembly into an inflatable bladder member, it is desirable, from an operational point of view, to locate the inflation valve assembly as close as possible to a corner region of the inflatable bladder member such that when the dunnage or cargo air bag is to be utilized in connection with the securing or bracing of cargo within the cargo holds of, for example, railroad cars, airplanes, ships, truck trailers, and the like, the inflation valve assembly is readily accessible in order to easily facilitate the bladder inflation operation. It is noted, however, that in connection with the second conventional PRIOR ART inflation valve assembly 10, and more particularly, in light of the aforenoted substantially large height dimension or depth profile of the inflation valve assembly 10, the inflation valve assembly 10 is not able to be located relatively close to the corner region of the inflatable bladder member because the opposite plies of the inflatable bladder member would not be capable of being brought together sufficiently in order to achieve the sealing of the same.

Accordingly, a need exists in the art for a new and improved inflation valve assembly wherein the same comprises relatively simple structure, comprising a relatively small number of cooperating parts, so as to comprise an inflation valve assembly which is structurally similar to the second conventional PRIOR ART inflation valve assembly comprising the flapper valve mechanism, as opposed to being structurally similar to the first conventional PRIOR ART inflation valve assembly comprising the spring-biased valve stem mechanism, and wherein further, while the overall structural features of the second conventional PRIOR ART inflation valve assembly are therefore sought to be retained, the substantially large height dimension or depth profile, characteristic of the second conventional PRIOR ART inflation valve assembly, is, however, able to effectively be reduced such that the new and improved inflation valve assembly can be structurally incorporated within the inflatable bladder member of the dunnage or cargo air bag at, for example, the operationally desirable corner position of the inflatable bladder member so as to in fact be capable of readily facilitating the inflation of the dunnage or cargo air bag when the dunnage or cargo air bag is to be utilized for securing or bracing cargo within the cargo holds of, for example, railroad cars, truck trailers, ships, airplanes, and the like.

OBJECTS OF THE INVENTION

Accordingly, it is an object of the present invention to provide a new and improved inflation valve assembly for incorporation within the inflatable bladder member of a dunnage or cargo air bag.

Another object of the present invention is to provide a new and improved inflation valve assembly for incorporation within the inflatable bladder member of a dunnage or cargo air bag so as to effectively overcome the various operational drawbacks characteristic of conventional PRIOR ART inflation valve assemblies.

An additional object of the present invention is to provide a new and improved inflation valve assembly, for incorporation within the inflatable bladder member of a dunnage or cargo air bag, wherein the new and improved inflation valve assembly is characterized by means of a substantially small or reduced height dimension or depth profile.

A further object of the present invention is to provide a new and improved inflation valve assembly, for incorporation within the inflatable bladder member of a dunnage or cargo air bag, wherein the new and improved inflation valve assembly is characterized by means of a substantially small or reduced height dimension or depth profile whereby the new and improved inflation valve assembly can be structurally incorporated within the inflatable bladder member of a dunnage or cargo air bag without adversely affecting the sealing operation of the inflatable bladder member of the dunnage or cargo air bag.

A yet further object of the present invention is to provide a new and improved inflation valve assembly, for incorporation within the inflatable bladder member of a dunnage or cargo air bag, wherein the new and improved inflation valve assembly is characterized by means of a substantially small or reduced height dimension or depth profile whereby the new and improved inflation valve assembly can be structurally incorporated within the inflatable bladder member of a dunnage or cargo air bag so as to readily permit or facilitate the sealing operation of the inflatable bladder member of the dunnage or cargo air bag as defined between oppositely disposed plies of the inflatable bladder member of the dunnage or cargo air bag.

A last object of the present invention is to provide a new and improved inflation valve assembly, for incorporation within the inflatable bladder member of a dunnage or cargo air bag, wherein the new and improved inflation valve assembly is characterized by means of a substantially small or reduced height dimension or depth profile which enables the new and improved inflation valve assembly to be located within the desirably accessible corner region of the inflatable bladder member so as to readily facilitate the inflation of the dunnage or cargo air bag when the dunnage or cargo air bag is to be utilized for securing or bracing cargo within the cargo holds of, for example, railroad cars, airplanes, ships, truck trailers, and the like.

SUMMARY OF THE INVENTION

The foregoing and other objectives are achieved in accordance with the teachings and principles of the present invention through the provision of a new and improved inflation valve assembly, for a dunnage or cargo air bag, wherein the new and improved inflation valve assembly comprises an annular flange member, the undersurface portion of which is adapted to be heat-sealed to the interior surface portion of one of the plies comprising the inflatable bladder. An externally threaded nipple portion of the inflation valve assembly is adapted to project outwardly through means of a suitable aperture formed within the ply of the inflatable bladder, as well as suitable apertures formed within the one or more paper plies comprising the dunnage or cargo air bag, such that when a suitable inflation nozzle is fluidically connected to the nipple portion of the inflation valve assembly, pressurized air can be conducted into the interior of the inflatable bladder so as to inflate the same. In addition, the inflation valve assembly also has a substantially C-shaped upstanding ring member integrally disposed upon the upper surface portion of the annular flange member, and a substantially planar, disc-type flapper valve member, having a substantially circular configuration, has an end portion which is adapted to be fixedly secured upon an arcuate portion of the upper surface portion of the annular flange member by means of a fixation bar which extends along a chordal extent of the annular flange member. Still further, the radially interior peripheral wall portion of the annular upstanding ring member is provided with an inner flange member which effectively serves as a valve seat for the substantially planar, disc-type flapper valve member when the flapper valve member is disposed in its CLOSED position or state. It is also noted that the substantially planar, disc-type flapper valve member is fabricated from a suitable rubber composition, and accordingly, that portion of the substantially planar, disc-type flapper valve member, which is disposed immediately adjacent to the fixation bar, inherently defines a living hinge portion by means of which the flapper valve member can be readily pivotally moved between its CLOSED and OPENED positions.

In accordance with the unique and novel structure characteristic of the new and improved inflation valve assembly of the present invention, opposite end portions of the fixation bar project radially inwardly toward each other so as to effectively define a pair of oppositely disposed detents. Accordingly, when the substantially planar, disc-type flapper valve member is moved from its CLOSED position to its fully OPENED position, opposite side portions of the flapper valve member will encounter the oppositely disposed detents of the fixation bar, the opposite side portions of the flapper valve member will accordingly be partially deformed as a result of being compressed radially inwardly by means of such oppositely disposed detents of the fixation bar, and the flapper valve member will therefore effectively be able to be moved past such oppositely disposed detents. Subsequently, once the flapper valve member has in fact moved past such oppositely disposed detents of the fixation bar, the opposite side portions of the flapper valve member will effectively regain their normal, non-compressed states such that the oppositely disposed detents will serve to retain the flapper valve member at its OPENED position or state. In this manner, the inflation valve assembly is then able to have an inflation nozzle member fluidically mated with the nipple portion of the inflation valve assembly so as to facilitate inflation of the inflatable dunnage or cargo air bag bladder. In view of the fact that the oppositely disposed detents, for maintaining the flapper valve member at its OPENED position or state, have effectively been integrally incorporated within the fixation bar, the need for the upstanding projections or ears, disposed upon the annular ring member of the second conventional PRIOR ART inflation valve assembly, has been rendered unnecessary, and accordingly, the height dimension or depth profile of the new and improved inflation valve assembly of the present invention is able to be substantially reduced so as to enable the new and improved inflation valve assembly of the present invention to achieve the aforenoted desirable objectives with respect to the sealing of the inflatable bladder and the location of the inflation valve assembly within the corner region of the dunnage or cargo air bag.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 1 is a cross-sectional view of a first, conventional PRIOR ART inflation valve assembly having a spring-biased valve stem mechanism incorporated therein for providing the inflation valve assembly with its CLOSED and OPENED operative states or positions;

FIG. 2 is a side perspective view of a second, conventional, PRIOR ART inflation valve assembly having a flapper valve member mounted thereon, and showing the various operative components thereof, wherein the flapper valve member is illustrated as being disposed at its CLOSED and SEATED position;

DETAILED DESCRIPTION OF THE PREFERRED EMBODIMENT

Figure 4:
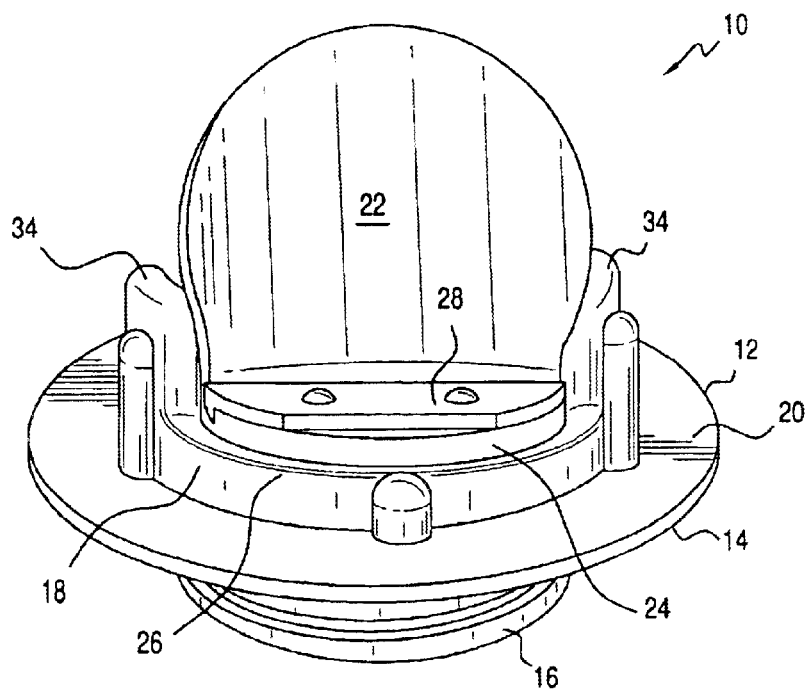
FIG. 4 is an end perspective view, corresponding with FIGS. 2 and 3, of the second, conventional, PRIOR ART inflation valve assembly as illustrated within FIGS. 2 and 3, and likewise showing the flapper valve member disposed at its OPENED and UNSEATED position as illustrated within FIG. 3.
Figure 5:
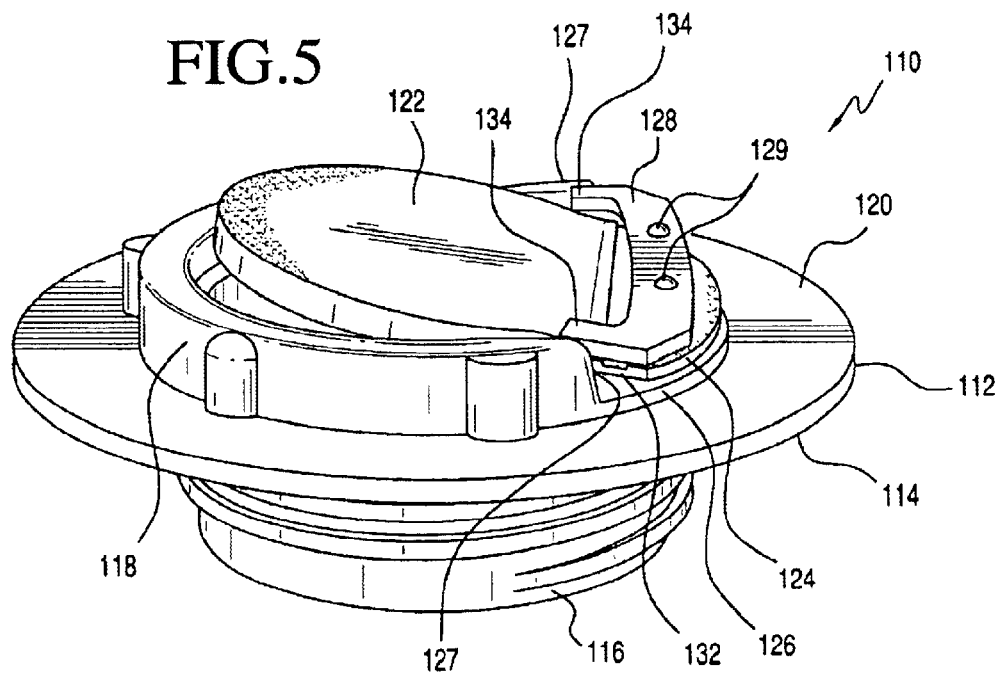
FIG. 5 is a side perspective view of a new and improved inflation valve assembly, constructed in accordance with the principles and teachings of the present invention, showing the various operative components thereof, and in particular, having a flapper valve member mounted upon the inflation valve assembly wherein the flapper valve member is illustrated as being disposed at its CLOSED and SEATED position.
Figure 6:
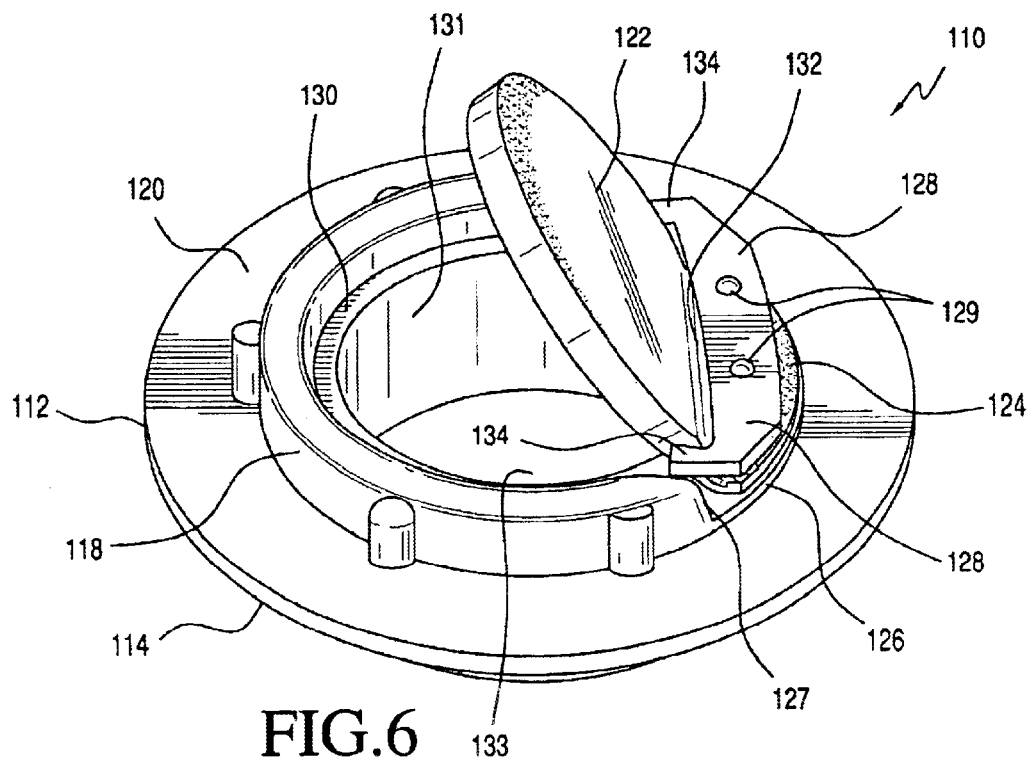
FIG. 6 is a side perspective view, similar to that of FIG. 5, of the new and improved inflation valve assembly of the present invention as illustrated in FIG. 5 showing, however, the flapper valve member disposed at its OPENED and UNSEATED position.
Figure 7:
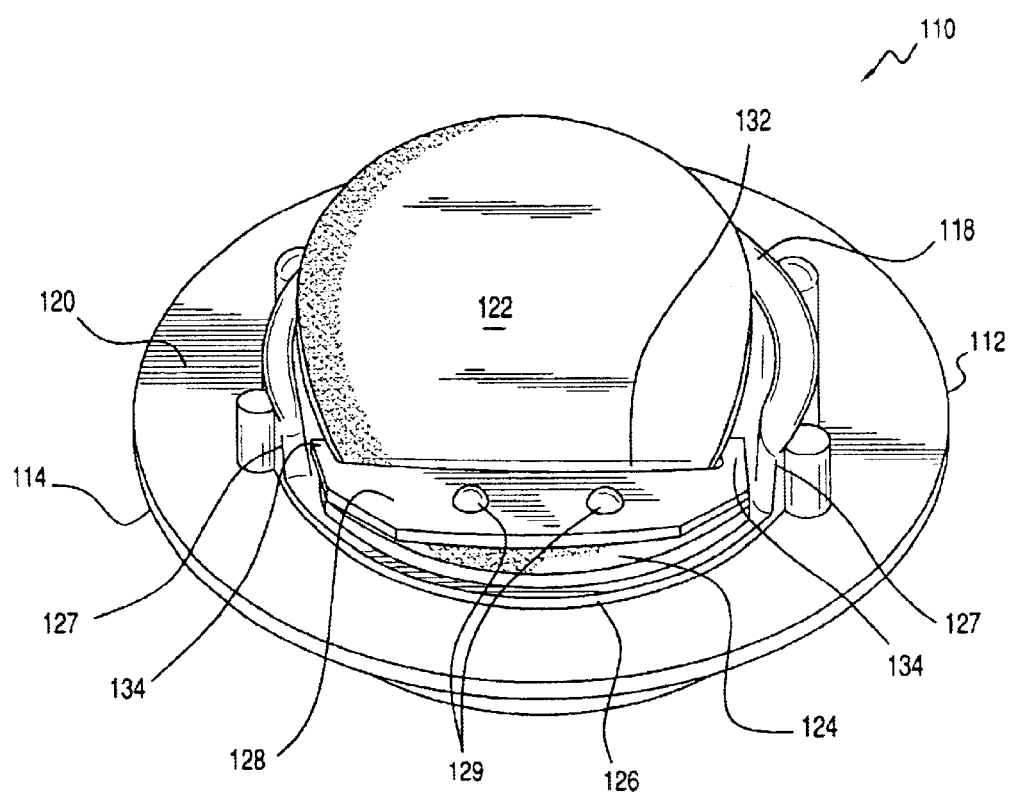
FIG. 7 is an end perspective view, corresponding with FIGS. 5 and 6, of the new and improved inflation valve assembly of the present invention as illustrated within FIGS. 5 and 6, and likewise showing the flapper valve member disposed at its OPENED and UNSEATED position as illustrated within FIG. 6.

Referring now to the drawings, and more particularly to FIGS. 5–7 thereof, a new and improved inflation valve assembly, constructed in accordance with the principles and teachings of the present invention, is disclosed and is generally indicated by the reference character 110. In connection with the new and improved inflation valve assembly 110, it is initially noted that the new and improved inflation valve assembly 110 of the present invention, as illustrated within FIGS. 5–7, is seen to be somewhat structurally similar to the second, conventional, PRIOR ART inflation valve assembly 10 as illustrated within FIG. 2–4, and accordingly, those various operative component parts of the new and improved inflation valve assembly 110 of the present invention, as illustrated within FIGS. 5–7, which are similar to those various operative component parts of the second, conventional, PRIOR ART inflation valve assembly 10, as illustrated within FIG. 2–4, will be designated by reference characters which are similar to those utilized to designate the various operative component parts of the second, conventional, PRIOR ART inflation valve assembly 10, except that the reference characters for designating the various operative component parts of the new and improved inflation valve assembly 110 of the present invention will be within the 100 series.

More particularly, the new and improved inflation valve assembly 110, constructed in accordance with the principles and teachings of the present invention, is seen to comprise an annular flange member 112 wherein, for example, the undersurface portion 114 of the annular flange member 112 is adapted to be heat-sealed, such as, for example, by means of ultrasonic welding techniques, to an interior surface portion of one of the plies comprising an inflatable bladder, wherein the inflatable bladder may be similar to the inflatable bladder 62 as disclosed within the aforenoted patent to Krier et al. An externally threaded nipple portion 116 of the inflation valve assembly 110 is integrally formed upon the undersurface portion 114 of the annular flange member 112 so as to extend downwardly therefrom, and in this manner, the threaded nipple portion 116 is adapted to project outwardly through a suitable aperture formed within the ply of the inflatable bladder to which the undersurface portion 114 of the annular flange member 112 is secured, as well as through suitable apertures formed within the one or more paper plies comprising the dunnage or cargo air bag. Accordingly, when a suitable inflation nozzle, not shown, is fluidically connected to the nipple portion 116 of the inflation valve assembly 110, pressurized air or compressed air can be conducted into the interior of the inflatable bladder so as to inflate the same. In addition to the aforenoted structure characteristic of the new and improved inflation valve assembly 110, it is further seen that the new and improved inflation valve assembly 110 also has a substantially annular upstanding ring member 118 which is integrally formed upon the upper surface portion 120 of the annular flange member 112 so as to extend upwardly therefrom, and in this manner, the upstanding ring member 118 is adapted to project inwardly into the inflatable bladder of the dunnage or cargo air bag so as to in fact be disposed internally within the inflatable bladder of the dunnage or cargo air bag.

Figure 3:
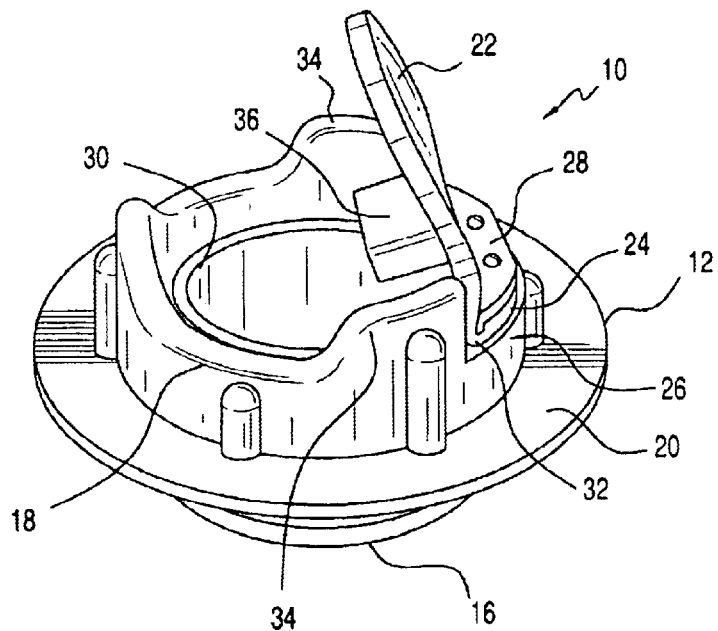
FIG. 3 is a side perspective view, similar to that of FIG. 2, of the second, conventional, PRIOR ART inflation valve assembly as illustrated in FIG. 2 showing, however, the flapper valve member disposed at its OPENED and UNSEATED position.

Continuing further, and as can best be appreciated from FIG. 7, a substantially planar, disc-type flapper valve member 122, having a substantially circular configuration, has an end portion 124 which is adapted to be fixedly secured upon the inflation valve assembly 110, however, contrary to the second conventional PRIOR ART inflation valve assembly 10 as disclosed within FIGS. 2–4, the end portion 124 of the substantially planar, disc-type flapper valve member 122 is secured directly to an arcuate section 126 of the upper surface portion 120 of the annular flange member 112 by means of a fixation bar 128 which extends along a chordal extent of the upper surface portion 120 of the annular flange member 112. In particular, it is seen, as may best be appreciated from FIGS. 5–7, that the substantially annular upstanding ring member 118 actually has a substantially C-shaped configuration, whereby the substantially C-shaped upstanding ring member 118 defines terminal end portions 127,127 which are circumferentially spaced from each other so as to spatially accommodate the end portion 124 of the flapper valve member 122, as well as the fixation bar 128, therebetween. Accordingly, in view of the fact that the end portion 124 of the substantially planar, disc-type flapper valve member 122 is in fact secured directly to the arcuate section 126 of the upper surface portion 120 of the annular flange member 112, as opposed to being secured to an arcuate section of the annular upstanding ring member 118, such a structural interrelationship comprises a first factor by means of which the thickness dimension or depth profile of the entire inflation valve assembly 110 can be reduced as compared to, for example, the thickness dimension or depth profile of the second conventional PRIOR ART inflation valve assembly 10.

It is noted further that in connection with the mounting of the fixation bar 128 upon the arcuate section 126 of the upper surface portion 120 of the annular flange member 112, a pair of laterally separated, upstanding studs or rivets 129,129 may be integrally formed upon the arcuate section 126 of the upper surface portion 120 of the annular flange member 112. The studs or rivets 129,129 are adapted to extend upwardly through suitable apertures formed within the fixation bar 128, whereupon the terminal end portions of the studs or rivets 129,129 being heat sealed or otherwise terminated, the fixation bar 128 is fixedly secured upon the arcuate section 126 of the upper surface portion 120 of the annular flange member 112. Still further, and as can best be seen from FIG. 6, the radially interior peripheral wall portion of the substantially C-shaped upstanding ring member 118 is provided with an inner flange member 130 which is effectively adapted to serve as a valve seat for the substantially planar, disc-type flapper valve member 122 when the flapper valve member 122 is disposed at its CLOSED position or state as substantially illustrated within FIG. 5, and the inner flange member 130 is also seen to be disposed upon the upper end portion of the inner peripheral wall member 131 of the externally threaded nipple portion 116. The inner peripheral wall member 131 effectively defines a through-bore 133 which is fluidically connected to the free or distal end portion of the externally threaded nipple portion 116 whereupon the inflation nozzle, not shown, beiong fluidically connected to the nipple portion 116 of the inflation valve assembly 110, pressurized air or compressed air can be conducted into the interior of the inflatable bladder, through means of the through-bore 133, as to inflate the same.

It is also noted that the substantially planar, disc-type flapper valve member 122 is fabricated from a suitable rubber composition, and accordingly, that portion of the substantially planar, disc-type flapper valve member 122, which is disposed immediately adjacent to the fixation bar 128, inherently defines a living hinge portion 132 by means of which the flapper valve member 122 is adapted to be readily pivotally moved between its OPENED and CLOSED positions as respectively disclosed within FIGS. 6 and 7, and FIG. 5. As can be additionally appreciated from FIGS. 5–7, the opposite ends of the fixation bar 128 are respectively provided with oppositely disposed, inwardly oriented detent members 134, and it can therefore be appreciated that when the substantially planar, disc-type flapper valve member 122 is moved from its CLOSED position as substantially illustrated in FIG. 5, to its fully OPENED position as illustrated in FIGS. 6 and 7, the opposite side portions of the flapper valve member 122 will encounter the oppositely disposed, inwardly oriented detent members 134,134 of the fixation bar 128. In this manner, the opposite side portions of the flapper valve member 122 will accordingly be partially deformed as a result of being compressed radially inwardly by means of such detent members 134,134 whereupon the flapper valve member 122 will therefore effectively be able to be moved past such detent members 134,134.

Subsequently, once the side portions of the flapper valve member 122 have in fact moved past such detent members 134,134, the side portions of the flapper valve member 122 will effectively regain their normal, non-compressed states such that the detent members 134,134 will now serve to retain the flapper valve member 122 at its OPENED position or state as illustrated within FIGS. 6 and 7. It is noted that in order to manually manipulate the flapper valve member 122 and to move the same from its CLOSED position as substantially illustrated within FIG. 5, to its fully OPENED position as illustrated within FIGS. 6 and 7, the external or undersurface portion of the flapper valve member 122 is preferably provided with an outwardly or downwardly extending projection or finger member or block, similar to the aforenoted outwardly or downwardly extending projection or finger block or member 36 utilized in conjunction with the flapper valve member 22 of the inflation valve assembly 10, although such a finger member or block, for use upon the flapper valve member 122, is not visible within FIGS. 5–7. It is noted further that once the flapper valve member 122 is retained at its OPENED position or state by means of the detent members 134,134, the inflation valve assembly 110 is then able to have an inflation nozzle member, not shown, fluidically mated with the nipple portion 116 of the inflation valve assembly 110 so as to facilitate inflation of the inflatable bladder of the dunnage or cargo air bag.

Accordingly, once the inflatable bladder of the dunnage or cargo air bag has in fact been inflated to its desirable extent, the inflation nozzle member, not shown, is withdrawn from its fluidic connection with the nipple portion 116 of the inflation valve assembly 110, and as a result of the relatively high internal pressurization of the inflatable bladder of the dunnage or cargo air bag, the air pressure disposed internally within the inflatable bladder of the dunnage or cargo air bag will force the flapper valve member 122 from its OPENED state or position, as illustrated within FIGS. 6 and 7, toward its CLOSED position or state as substantially illustrated within FIG. 5. More particularly, it can be appreciated that the relatively high internal air pressure disposed within the inflatable bladder of the dunnage or cargo air bag will be sufficient enough to move the flapper valve member 122 from its OPENED state or position, as illustrated within FIGS. 6 and 7, toward its CLOSED position or state as substantially illustrated within FIG. 5, as a result of causing the side portions of the flapper valve member 122 to effectively undergo deformation with respect to the oppositely disposed detent members 134,134 of the fixation bar 128, and thereby overcome the retention force of the detent members 134,134 with respect to the side portions of the flapper valve member 122, whereby the opposite side portions of the flapper valve member 122 can move past the oppositely disposed detent members 134,134 of the fixation bar 128. In this manner, the movement of the flapper valve member 122 to its CLOSED position or state, as substantially illustrated within FIG. 5, whereby the flapper valve member 122 is effectively disposed upon its valve seat 130, will prevent the undesirable discharge of the pressurized air from the interior of the inflatable bladder of the dunnage or cargo air bag such that the dunnage or cargo air bag does not experience undesirable deflation. Subsequently, a suitable threaded cap, not shown, can be threadedly engaged upon the threaded nipple portion 116 of the inflation valve assembly 110 so as to permanently retain the pressurized air within the inflatable bladder of the dunnage or cargo air bag, and thereby maintain the dunnage or cargo air bag in its inflated state, until deflation of the dunnage or cargo air bag is in fact desired.

In light of the foregoing, it is to be specifically noted and emphasized further that in view of the fact that the opposite ends of the fixation bar 128 are provided with the detent members 134,134 for encountering and operatively engaging the side portions of the flapper valve member 122 so as to releasably maintain the flapper valve member 122 at its OPENED position or state, as opposed to the provision of the upstanding projections or ears 34,34 upon the annular ring member 18 of the first conventional PRIOR ART inflation valve assembly 10, such a structural interrelationship comprises a second factor by means of which the thickness dimension or depth profile of the entire inflation valve assembly 110 can be reduced as compared to, for example, the thickness dimension or depth profile of the second conventional PRIOR ART inflation valve assembly 10. Accordingly, it is to be noted further that this second factor, comprising the location of the detent members 134, 134 upon the opposite ends of the fixation bar 128, and by means of which the thickness dimension or depth profile of the entire inflation valve assembly 110 can be reduced as compared to, for example, the thickness dimension or depth profile of the second conventional PRIOR ART inflation valve assembly 10, operatively cooperates with the aforenoted first factor, comprising the mounting of the fixation bar 128 directly upon the upper surface portion 120 of the annular flange member 112, so as to contribute further to the effective reduction in the depth profile or thickness dimension of the entire inflation valve assembly 110 as compared to, for example, the thickness dimension or depth profile of the second conventional PRIOR ART inflation valve assembly 10.

Thus, it may be seen that in accordance with the principles and teachings of the present invention, there has been provided a new and improved inflation valve assembly wherein the relatively simple structure, comprising a relatively small number of cooperating parts, of the conventional PRIOR ART inflation valve assembly has been retained, however, contrary to the structural features of such conventional PRIOR ART inflation valve assembly, the substantially large height dimension or depth profile, characteristic of the conventional PRIOR ART inflation valve assembly, has effectively been able to be reduced such that the new and improved inflation valve assembly can be structurally incorporated within the inflatable bladder member of the dunnage or cargo air bag at, for example, the operationally desirable corner position of the inflatable bladder member so as to in fact be capable of readily facilitating the inflation of the dunnage or cargo air bag when the dunnage or cargo air bag is to be utilized for securing or bracing cargo within the cargo holds of, for example, railroad cars, airplanes, ships, truck trailers, and the like.

Obviously, many variations and modifications of the present invention are possible in light of the above teachings. For example, while the inflation valve has been disclosed as being used in conjunction with an inflatable bladder adapted to be disposed internally within an outer bag fabricated from a plurality of paper plies, the inflatable bladder may alternatively be disposed within an outer bag which may be fabricated from materials other than paper, or alternatively still further, the inflatable bladder may itself comprise the dunnage bag, that is, it need not be disposed or enclosed within an outer bag. In addition, the inflatable bladder may be fabricated from various different materials, such as, for example, VALERON®, polyethylene with woven NYLON®, a single-ply KRAFT® paper laminated with polyethylene, and the like. Still further, while the flange portion of the inflation valve assembly has been noted as being fixedly mounted upon, or heat-sealed to, an interior surface portion of the inflatable bladder, it can likewise be mounted upon, or heat-sealed to, an exterior surface portion of the inflatable bladder. It is therefore to be understood that within the scope of the appended claims, the present invention may be practiced otherwise than as specifically described herein.

What is claimed as new and desired to be protected by Letters Patent of the United States of America, is:

1. An inflation valve assembly for facilitating the inflation of an inflatable article, comprising:

an annular flange member having a first surface portion which is adapted to be pneumatically sealed upon a wall surface of the inflatable article;

a nipple portion, adapted to be connected to an external source of fluid pressure, integrally connected to said first surface portion of said annular flange member and defining a fluid passageway which extends through said annular flange member for conducting pressurized air into the interior of the inflatable article;

a flapper valve member movably disposed upon a second surface portion of said annular flange member between a first OPENED position by means of which pressurized air can be fluidically conducted into and out from the interior portion of the inflatable article, and a second CLOSED position by means of which pressurized air is prevented from being fluidically conducted into and out from the interior portion of the inflatable article;

a fixation bar extending in a chordwise manner across a portion of said second surface portion of said annular flange member so as to secure said flapper valve member upon said second surface portion of said annular flange member; and detent means, defined upon opposite end portions of said fixation bar, for engaging said flapper valve member, as said flapper valve member is moved from said second CLOSED position to said first OPENED position, so as to retain said flapper valve member at said first OPENED position in order to permit pressurized air to be fluidically conducted into and out from the interior portion of the inflatable article.

2. The inflation valve assembly as set forth in claim 1, further comprising:

a ring member integrally mounted upon said second surface portion of said annular flange member; and a valve seat formed upon an interior wall portion of said ring member for mating with said flapper valve member when said flapper valve member is disposed at said second CLOSED position.

3. The inflation valve assembly as set forth in claim 2, wherein:

said ring member has a substantially C-shaped configuration.

4. The inflation valve assembly as set forth in claim 3, wherein:

said substantially C-shaped ring member has circumferentially spaced terminal end portions; and an end portion of said flapper valve member is fixedly mounted upon said second surface portion of said annular flange member between said terminal end portions of said substantially C-shaped ring member.

5. The inflation valve assembly as set forth in claim 4, wherein:

said flapper valve member is fabricated from a suitable rubber composition.

6. The inflation valve assembly as set forth in claim 5, wherein:

said flapper valve member is pivotally mounted upon said second surface portion of said annular flange member so as to be pivotally movable between said first and second OPENED and CLOSED positions.

7. The inflation valve assembly as set forth in claim 6, wherein:

a living hinge section is defined upon said flapper valve member immediately adjacent to said end portion of said flapper valve member so as to permit said flapper valve member to be pivotally mounted upon said second surface portion of said annular flange member between said first and second OPENED and CLOSED positions.

8. The inflation valve assembly as set forth in claim 4, wherein:

said fixation bar, for fixing said end portion of said flapper valve member upon said second surface portion of said annular flange member, is interposed between said terminal end portions of said substantially C-shaped ring member.

9. The inflation valve assembly as set forth in claim 1, wherein:

said detent means project radially inwardly toward each other.

10. In combination, an inflatable article and an inflation valve assembly for facilitating the inflation of the inflatable article, comprising:

an inflatable article;

an annular flange member having a first surface portion pneumatically sealed upon a wall surface of said inflatable article;

a nipple portion, adapted to be connected to an external source of fluid pressure, integrally connected to said first surface portion of said annular flange member and defining a fluid passageway which extends through said annular flange member for conducting pressurized air into the interior of said inflatable article;

a flapper valve member movably disposed upon a second surface portion of said annular flange member between a first OPENED position by means of which pressurized air can be fluidically conducted into and out from said interior portion of said inflatable article, and a second CLOSED position by means of which pressurized air is prevented from being fluidically conducted into and out from said interior portion of said inflatable article;

a fixation bar extending in a chordwise manner across a portion of said second surface portion of said annular flange member so as to secure said flapper valve member upon said second surface portion of said annular flange member; and detent means, defined upon opposite end portions of said fixation bar, for engaging said flapper valve member, as said flapper valve member is moved from said second CLOSED position to said first OPENED position, so as to retain said flapper valve member at said first OPENED position in order to permit pressurized air to be fluidically conducted into and out from said interior portion of said inflatable article.

11. The inflation valve assembly as set forth in claim 10, wherein:

said detent means project radially inwardly toward each other.

12. The combination as set forth in claim 10, further comprising:

a ring member integrally mounted upon said second surface portion of said annular flange member; and a valve seat formed upon an interior wall portion of said ring member for mating with said flapper valve member when said flapper valve member is disposed at said CLOSED position.

13. The combination as set forth in claim 12, wherein:

said ring member has a substantially C-shaped configuration.

14. The combination as set forth in claim 13, wherein:

said substantially C-shaped ring member has circumferentially spaced terminal end portions; and an end portion of said flapper valve member is fixedly mounted upon said second surface portion of said annular flange member between said terminal end portions of said substantially C-shaped ring member.

15. The combination as set forth in claim 14, wherein:

said flapper valve member is fabricated from a suitable rubber composition.

16. The combination as set forth in claim 15, wherein:

said flapper valve member is pivotally mounted upon said second surface portion of said annular flange member so as to be pivotally movable between said first and second OPENED and CLOSED positions.

17. The combination as set forth in claim 16, wherein:

a living hinge section is defined upon said flapper valve member immediately adjacent to said end portion of said flapper valve member so as to permit said flapper valve member to be pivotally mounted upon said second surface portion of said annular flange member between said first and second OPENED and CLOSED positions.

18. The combination as set forth in claim 14, wherein:

said fixation bar, for fixing said end portion of said flapper valve member upon said second surface portion of said annular flange member, is interposed between said terminal end portions of said substantially C-shaped ring member.

19. The combination as set forth in claim 10, wherein:

said inflatable article comprises an inflatable bladder for enclosure within a cargo air bag.

20. The combination as set forth in claim 19, wherein:

said cargo air bag, enclosing said inflatable bladder, comprises at least one paper ply.

21. The combination as set forth in claim 10, wherein:

said inflatable article comprises an inflatable bladder which comprises a cargo air bag per se.

22. The combination as set forth in claim 21, wherein:

said inflatable bladder may be fabricated from a material selected from the group comprising a plastic material, VALERON®, polyethylene with woven NYLON®, and a single-ply KRAFT® paper laminated with polyethylene.

* * * * *